United States Patent [19]

Shibata et al.

[11] Patent Number: 4,955,126
[45] Date of Patent: Sep. 11, 1990

[54] PROCESS FOR FUSING STEEL SLABS IN LONGITUDINAL DIRECTION THEREOF

[75] Inventors: Masaru Shibata; Masayuki Onishi; Hitoshi Ohsugi; Shigeru Ogura; Masaru Washio; Hideo Kuguminato; Yoshiaki Hara, all of Chiba, Japan

[73] Assignee: Kawasaki Steel Corporation, Kobe, Japan

[21] Appl. No.: 341,142

[22] Filed: Apr. 20, 1989

[30] Foreign Application Priority Data

Apr. 26, 1988 [JP] Japan .................. 63-101467

[51] Int. Cl.⁵ .............................. B23P 17/00
[52] U.S. Cl. .................. 29/527.6; 169/69.1; 169/263
[58] Field of Search .............. 164/263, 69.1, 460; 29/527.6

[56] References Cited

U.S. PATENT DOCUMENTS 4,766,947  8/1988  Shibuya et al. .............. 164/460

FOREIGN PATENT DOCUMENTS 3414824A  10/1985  Fed. Rep. of Germany .
3515111A  11/1986  Fed. Rep. of Germany .
  628988  10/1978  U.S.S.R. .............. 164/263

Primary Examiner—Carl E. Hall
Assistant Examiner—Carl J. Arbes
Attorney, Agent, or Firm—Dvorak and Traub

[57] ABSTRACT

A process for fusing a steel slab in a longitudinal direction thereof is disclosed, wherein when the steel slab is fused in the longitudinal direction at more than 500° C. and at a speed of more than 300 mm/min., a surface portion of the slab including at least a lower portion of a longitudinally fused surface portion thereof is mechanically removed by cutting or grinding.

4 Claims, 5 Drawing Sheets

FIG_1
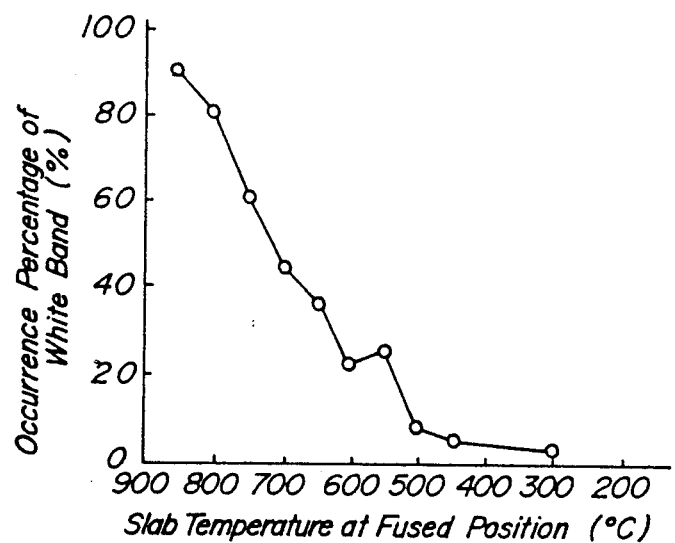
FIG_2
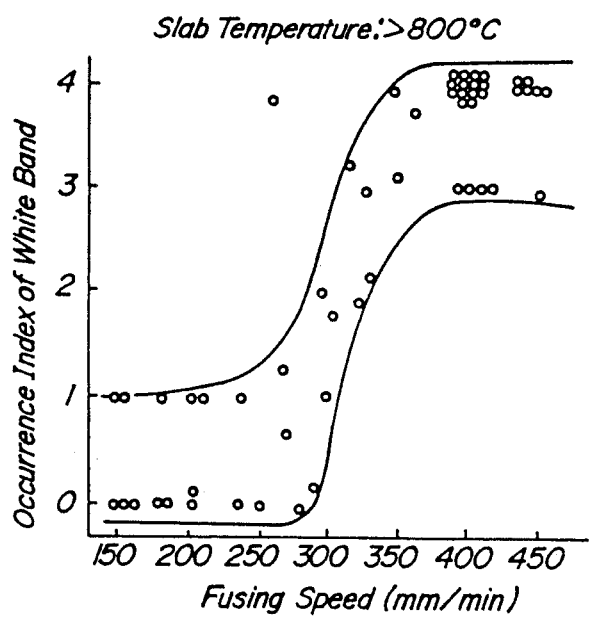

FIG_5
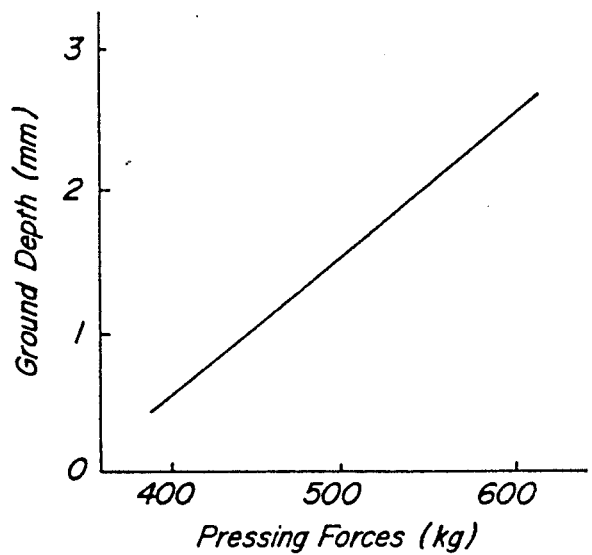
FIG_6
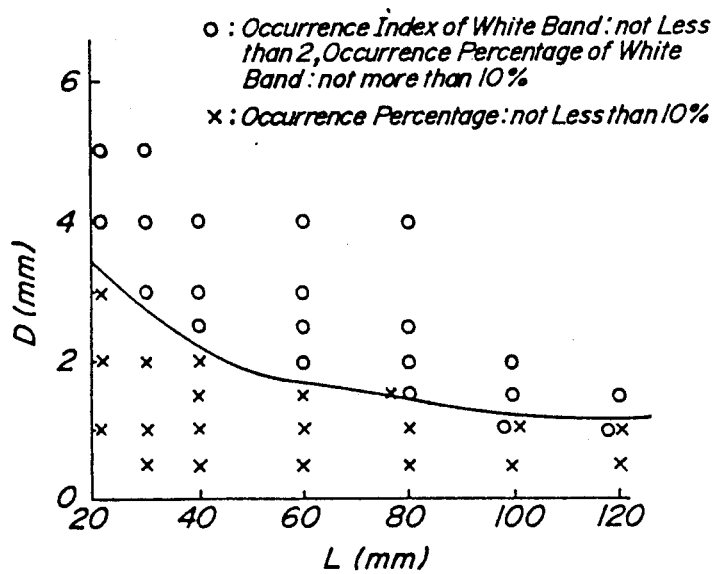

PROCESS FOR FUSING STEEL SLABS IN LONGITUDINAL DIRECTION THEREOF

BACKGROUND OF THE INVENTION

(1) Field of the Invention:

The present invention relates to a process for fusing a wide steel slab, in a longitudinal direction thereof, obtained by continuous casting or blooming so that surface abnormalities at widthwise edge portions of coils, particularly, of raw sheet to be surface-treated, which are produced by fusing the steel slab to obtain divided slabs, and further hot rolling and cold rolling the thus obtained slabs, may be prevented.

(2) Related Art Statement:

In order to improve productivity in continuously casting plants, it is recently a common practice that a wide slab is cast in such a cast width that two or more of slabs having a required width can be obtained therefrom, the wide slab is cut with a torch at a given length, and lastly a plurality of slabs are produced by dividing the cut slab in a given width in a longitudinal direction by fusing it with gas or gas cutting On the other hand, it is also a common practice that a so-called excess slab, which is produced by continuous casting or blooming without a specific order from customers, is cut in a given width over a longitudinal direction upon receipt of an specific order.

As shown in FIG. 8, since a surface portion at a fused plane 2 is partially melted and solidified again during gas fusion-cutting, a metal structure (solidified molten layer) 2a, which is different from a cast structure appearing on casting and solidification, is formed. Since this molten solidified layer is oxidized with oxygen gas or oxygen in air used for fusing during the fusing, a great amount of oxygen is dissolved into the melted surface portion. Consequently, as shown in FIG. 9, contents of alloying elements such as Al and Mn in the molten solidified layer become lower as compared with those of a slab base portion, so that physical, chemical and/or electrical properties of the former differ from those of the latter.

Consider that a cold rolled coil is obtained by hot rolling and cold rolling the above slab without removing the molten solidified layer, and then its surface is plated. In this case, as shown in FIG. 10, a white stripe (hereinafter referred to as "white band") 4, which has a luster different from that of the central portion, often appears over a width of dozens of millimeters from a widthwise edge of the coil 3, which edge corresponds to the divided face of the slab.

This white band is considered to be formed as follows:

When the above-mentioned molten solidified layer, formed produced at the fused surface portion, remains without being removed as a scale in hot rolling, the layer moves around opposite edge surface portions of the hot rolled coil owing to the flowing of the material at the edges during the hot rolling. The thus moved layer remains at the edge portion of the cold rolled coil in a band-like form. When the coil is plated, the band portion has electrochemical properties different from those of the surface layer of the coil central portion, that is, the surface layer of the slab base portion. Therefore, the state in which the plating metal is deposited on the coil, differs between the band portion and the central portion.

Since the above white band damages the external appearance of products, the band must be removed by cutting. Therefore, there are problems in that this greatly reduces yield of the products, and slows down the production line.

Further, when the above cold rolled coil is subjected to various treatment such as physical, chemical and/or electrical surface treatment even without being plated, a surface layer (white band) having different physical, chemical and/or electrical properties is formed at the edge surface portion of the cold rolled coil in the band-like form. Consequently, there is a great possibility that various surface abnormalities occur.

SUMMARY OF THE INVENTION

The present invention has been accomplished to prevent surface abnormalities at an edge portion of a cold rolled coil, such as a white band occurring at an edge portion of the plated coil product, which abnormalities are caused by a molten solidified layer which is formed at a melted face produced when the steel slab is divided in a longitudinal direction by fusing.

The present invention considers the following. (a) When a process is employed for fusing a wide steel slab in a longitudinal direction, which comprises the step of fusing the slab in a longitudinal direction while a surface temperature of the slab near a fused plane is kept at not more than 500° C., surface abnormalities of an edge portion of a coil, which is obtained by fusing the steel slab in a longitudinal direction, followed by hot rolling and cold rolling, can be prevented. (b) When a process is employed for fusing a wide steel slab in a longitudinal direction, which comprises the step of fusing the slab in the longitudinal direction while when the surface temperature of the slab near a fused plane exceeds 500° C., the fusing is effected at a speed of not more than 300 mm/min, surface abnormalities of an edge portion of a coil, which is obtained by fusing the steel slab in the longitudinal direction, followed by hot rolling and cold rolling, can be prevented.

In order to improve productivity in continuously casting plants, it may be necessary that a slab having a double width is cast, quickly cut while being hot to save energy, and charged into a reheating furnace in the succeeding step. The present invention is suited for this purpose, as discussed below.

(1) According to the first aspect of the present invention, a process for fusing a wide steel slab in a longitudinal direction is provided, which comprises the step of fusing the slab in the longitudinal direction, while when the surface temperature of the slab near the fused plane exceeds 500° C. and the fusing speed is more than 300 mm/min., a surface layer including at least a lower portion of the fused plane of the slab in the longitudinal direction is mechanically removed by cutting or grinding. Thereby, surface abnormalities of an edge portion of the coil, which is obtained by fusing the steel slab in the longitudinal direction, followed by hot rolling and cold rolling, can be prevented.

(2) According to a second aspect of the present invention, which is an improvement used in the fusing process of the first aspect of the present invention, a process for fusing the steel slab in the longitudinal direction is provided, wherein the surface layer in the fused plane of the slab to the longitudinal direction is mechanically removed by cutting or grinding in such a depth that the thickness of a modified layer of the surface portion formed during the fusing is not more than 1 mm.

Thereby, occurrence of abnormalities of the surface properties of the coil obtained by fusing the slab in the longitudinal direction is prevented.

The present invention is adapted for preventing surface abnormalities in the form of the white band occurring at the widthwise edge portion of the coil which is obtained by hot rolling and cold rolling the steel slab having been fused in the longitudinal direction, when the coil is electrically plated. Effects obtained in the above cases (a) and (b) will first be discussed as follows:

(a) When the wide steel slab is fused in the longitudinal direction while the surface temperature of the slab near the fused plane is kept at not more than 500° C., the thickness of the molten solidified layer at the fused face of the slab is not more than 1 mm. Thus, the molten solidified layer is removed as a scale during the hot rolling of the slab, so that the solidified layer will not remain at the widthwise edge surface portion of the hot rolled coil, and further at the widthwise edge surface of the cold rolled coil. Accordingly, no surface abnormalities will occur.

(b) When the wide steel slab is fused in the longitudinal direction while the surface temperature of the slab near the fused plane exceeds 500° C., the thickness of the solidified molten layer at the fused plane of the slab is not more than 1 mm and no surface abnormalities will occur as in the case of the above (a), if the fusing speed is not more than 300 mm/min.

The present invention exhibits the following functions.

(1) When the wide steel slab is fused in the longitudinal direction while the surface temperature of the slab near the fused plane exceeds 500° C. and the fusing speed is more than 300 mm/min., the molten solidified layer gradually becomes thicker from the upper to the lower surfaces of the slab as viewed in the fusing direction. When the fused surface layer including at least the lower half portion of the fused plane is mechanically removed by cutting or grinding, the molten solidified layer formed during the fusing is removed, and even a remaining portion thereof is removed as the scale during the hot rolling. Therefore, no surface abnormalities will occur.

(2) When the longitudinally fused surface portion of the steel slab is mechanically cut or ground off to such a depth that the thickness of the modified layer in the surface portion formed during the fusing is not more than 1 mm, any remaining portion of the molten solidified layer is removed as the scale during the hot rolling. Thereby, the hot rolled or cold rolled coil having excellent surface properties can be obtained, so that no white band is formed at the edge portion of the coil even when it is plated.

BRIEF DESCRIPTION OF THE ATTACHED DRAWINGS

For a better understanding of the invention, reference is made to the attached drawings, wherein:

FIG. 1 is a graph illustrating the relationship between the surface temperature of the slab at the fused position and the occurrence percentage of the white band;

FIG. 2 is a graph illustrating the relationship between the fusing speed and the occurrence index of the white band when the surface temperature of the slab is not less than 800° C.;

FIG. 5 is a graph illustrating the relationship between pressing forces of a grinding stone of a grinder and the ground depth of the slab;

FIG. 6 is a graph illustrating the relationship among the ground area L, the ground depth D and the occurrence of the white band in the cold rolled coil electrically plated with Zn;

DETAILED DESCRIPTION OF THE INVENTION

First, circumstances having reached the invention and its examples will be described below.

A low carbon aluminum-killed steel, 200 to 260 mm thick and 1,400 to 1,900 mm wide, was continuously cast, and then cut in a given length (7,000 to 9,000 mm) by a torch. The steel was longitudinally divided by fusing, and the relationship between the surface temperature of the slab (hereinafter referred to briefly as "slab temperature") at the time of the fusion dividing of the slab and the occurrence percentage of the white band at the edge portion of the coil which was obtained by hot rolling, cold rolling the slab and electrically plating it with Zn without treating the fused plane of the slab was determined. This relationship is shown in FIG. 1.

As shown in FIG. 1, when the slab temperature is not more than 500° C., the occurrence percentage of the white band is as low as not more than 10%. On the other hand, when the slab temperature is more than 500° C., the occurrence percentage is more than 20%.

Figure 3:
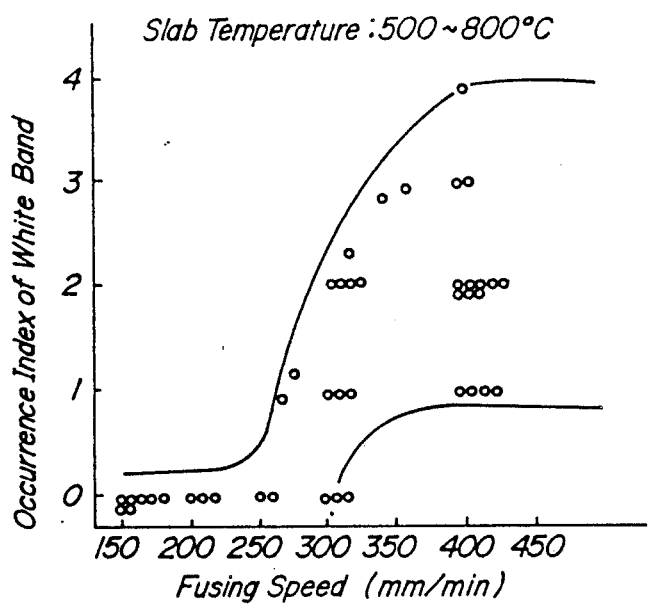
FIG. 3 is a graph illustrating the relationship between the fusing speed and the occurrence index of the white band when the surface temperature of the slab is in a range from 500 to 800° C.
Figure 4:
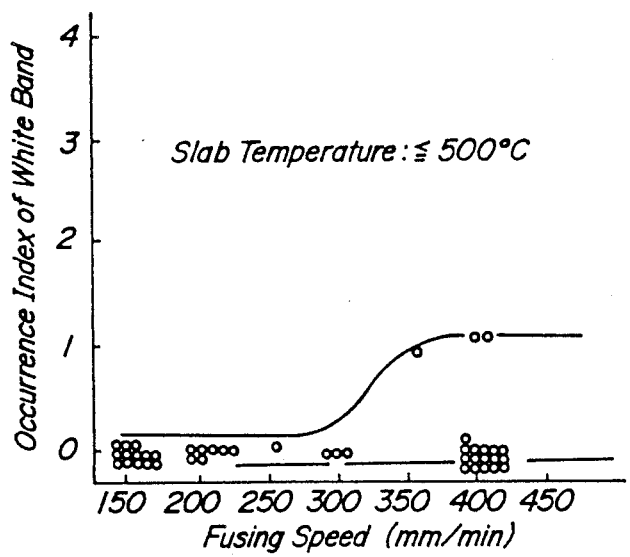
FIG. 4 is a graph illustrating the relationship between the fusing speed and the occurrence index of the white band when the surface temperature of the slab is not more than 500° C.

FIG. 2 shows the occurrence index of the white band when the fusing speed was varied in a range from 150 to 450 mm/min., while the slab temperature was kept at not less than 800° C. The occurrence index of the white band given in FIG. 2 is defined in the following Table 1. It is seen from FIG. 2 that even when the slab temperature is substantially the same, the occurrence of the white band differs with change in the fusing speed. It is also apparent that when the fusing speed is more than 300 mm/min., the occurrence of the white band clearly becomes conspicuous. There is a tendency that as the fusing speed increases, the occurrence of the white band becomes greater. As shown in FIG. 3, such a tendency is recognized until the slab temperature reaches 500° C. or more. As shown in FIG. 4, the influence of the fusing speed upon the occurrence of the white band is slight in the case that the slab temperature is not more than 500° C.

TABLE 1

| Occurrence index of white band | Occurred degree of white band of cold rolled coil after plating |
|---|---|
| 0 | No white band (No white band occurred over entire length) |
| 1 | Slight (Occurred over not more than 10% of entire length) |
| 2 | Medium (Occurred over 10 to 70% of entire length) |
| 3 | Greatly, intermittently occurred (Occurred over about 70 to 90% of entire length) |
| 4 | Continuously occurred (Occurred over not less than 90% of entire length) |

From the above results, it is made clear that when the coil obtained by hot rolling the slabs and cold rolling after being cut in its longitudinal direction is to be electrically plated, the following techniques are effective for preventing surface abnormalities at the edge portion of the cold rolled coil, such as the white band occurring at the widthwise edge of the coil.

(1) The slab is fused while the surface temperature of the slab at the fusing position is kept at not more than 500° C.

(2) When the slab temperature is more than 500° C. at the fusing position, the slab is fused at the fusing speed of not more than 300 mm/min.

(3) When the slab is fused at the slab temperature of more than 500° C. while the fusing speed is more than 300 mm/min., the fused surface portion is removed by a means causing no melting oxidation of the fused surface portion, that is, by mechanical cutting or grinding.

Next, specific examples of the present invention will be described.

A steel slab, 200 to 260 mm thick and 1,400 to 1,900 mm wide, was produced from a low carbon aluminum-killed steel by continuous casting, and was divided by fusing in a longitudinal direction by means of a propane-oxygen burner, while the slab temperature at a fused plane was varied among three levels of not more than 500° C., 500 to 800° C. and not less than 800° C. and the fusing speed was varied in a range from 150 to 400 mm/min. Each of divided slabs was hot rolled, and further cold rolled, without cutting or grinding the fused surface portion, to obtain a coil, which was electrically plated with Zn. The occurred degree of the white band in the widthwise edge portion of the coil after the plating was expressed by the index according to Table 1, and the relationship between the fusing speed and the occurrence index of the white band is shown with respect to each of the three levels of the slab temperatures in FIGS. 2, 3 and 4, respectively.

When the slab was cut by fusion at not more than 500° C., the occurrence index of the white band was not more than 1 irrespective of the fusing speed. When the slab was fused at 500 to 800° C. or not less than 800° C., the occurrence index of the white band was not more than 2 if the fusing speed was not more than 300 mm/min. However, if the fusing speed exceeded 300 mm/min., the occurrence index became rapidly higher as the temperature increases, and many surface defects occurred.

Then, a slab, 230 mm thick and 1,400 to 1,900 mm wide, was obtained by fusion-dividing a wide slab in a longitudinal direction at a fusing speed of more than 300 mm/min., while the slab temperature was kept at not less than 800° C. Then, the fused surface layer was ground by a train type grinder. Dimensions of the train type grinder used are shown in Table 2 below.

TABLE 2

| Items | Dimensions |
|---|---|
| Diameter of grinding stone (mm) | 460 in diameter |
| Controlling of pressing forces | Hydraulic cylinder system (63 mm in diameter) normal ampere: 100 A, loading: 450 kg (14.4 kg/cm$^2$) |
| RPM of grinding stone | Belt driven system, normal ampere: 100 A, 55 kw |

Figure 8:
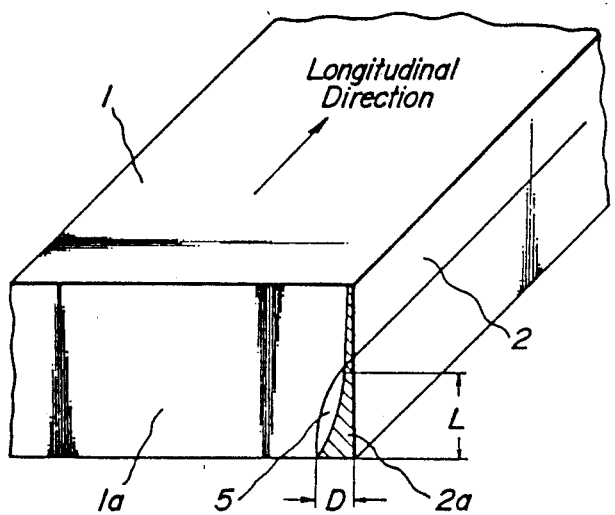
FIG. 8 is a perspective view diagrammatically illustrating the occurrence of the solidified molten layer in the fused surface portion.
Figure 9:
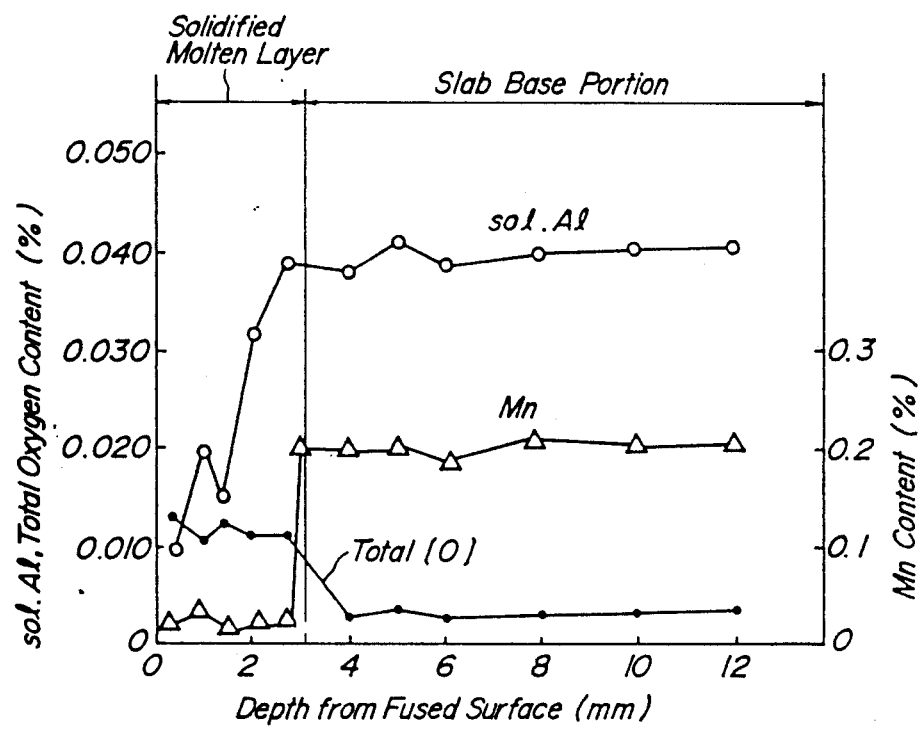
FIG. 9 is a graph illustrating the relationship among the depths from the fused plane, showing solid-dissolved Al, the total content of oxygen, and the content of Mn.
Figure 10:
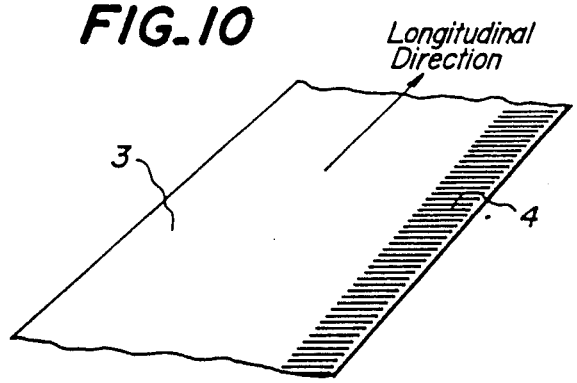
FIG. 10 is a view diagrammatically illustrating the occurrence of the white band at the widthwise edge portion of the slab.

The relationship between the pressing forces of the grinding stone of the grinder and the ground depth is shown in FIG. 5. The ground depth was variously varied by changing the pressing forces. FIG. 6 shows the relationship among the ground zone L from the lower surface of the slab, the ground depth D and the occurrence of the white band as shown in FIG. 8. In FIG. 2, slabs having the occurrence indexes of not less than 2 and the occurrence percentages of not more than 10% are denoted by O, while those having the occurrence percentages of more than 10% are denoted by X. As mentioned above, since the thickness of the solidified molten layer is about 3 to 4 mm at the maximum at the lower surface of the slab, the occurrence of the white band can substantially be prevented when the ground depth D is about 3 mm and about 2 mm in the area of L=30 to 40 mm from the lower surface and in the area higher than this area, respectively.

A slab, 230 mm thick, was obtained by fusing and dividing a wide slab in a longitudinal direction at a slab temperature of not less than 500° C. and a fusing speed of 400 mm/min. by means of an oxygen-propane burner, and then was hot rolled and cold rolled while its fused surface portion was not treated, thereby obtaining a coil. The coil was electrically plated with Zn. The occurrence indexes of the white band in the widthwise edge portions of the thus obtained coils were not less than 2 (Comparative Examples).

On the other hand, a fused slab as mentioned above was similarly hot rolled and cold rolled after the fused surface portion was removed by the train type grinder in the thickness of 3.0 to 3.5 mm in an area from the lower surface to a level of 30 to 40 mm high and in the thickness of about 2.0 mm in an area from the level of 30 to 40 mm to a level of 120 mm high. The thus obtained cold rolled coils were plated with Zn, which had the occurrence index of not less than 2 (Examples of the present invention).

Figure 7:
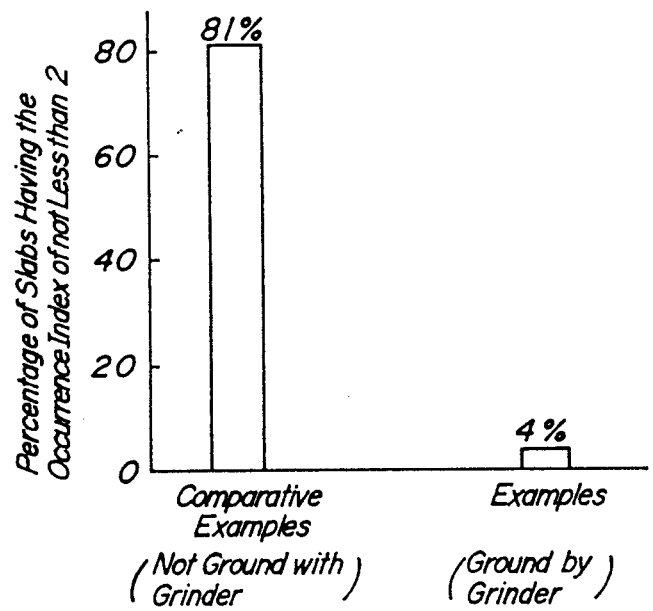
FIG. 7 is a graph illustrating the occurrence of the white bands in Examples and Comparative Examples.

Two hundreds of the above coils in each of Comparative Examples and Examples were investigated, and results are shown in FIG. 7.

The percentage of the slabs having the occurrence index of not less than 2 was as high as 81% in Comparative Examples, while that in Examples of the present invention is as low as 4%.

In the above experiments, the effects obtained by the present invention are shown with respect to the occurrence of the white bands in the coils in which the cold rolled sheet was electrically plated with Zn. Needless to say, even in the case that the cold rolled sheet is plated by other plating technique, or in the case that the cold rolled sheet is subjected to other physical, chemical and/or electrical treatment, surface abnormalities at the coil edge portion can be prevented. Further, although the fused surface portion of the slab is inexpensively and effectively removed with the grinder, as a matter of course, other mechanical cutting can be employed.

According to the process of the present invention, when a plurality of divided slabs having a given width are obtained by first casting a wide slab and then cutting it with a torch in a longitudinal direction, it is possible to effectively prevent surface abnormalities of cold rolled coil products at widthwise edge portions owing to molten solidified layers appearing at the longitudinally fused surfaces. Therefore, the present invention has great effects of improving the quality of the products and productivity in the continuously casting plants.

These and other objects, features and advantages of the invention will be appreciated upon reading of the invention when taken in conjunction with the attached drawings, with the understanding that some modifications, variations and changes of the same could be made by the skilled person in the art to which the invention pertains without departing from the spirit of the invention or the scope of claims appended hereto.

What is claimed is:

1. A process for cutting a steel slab being continuously cast, comprising the steps of:
    (1) maintaining said slab at a temperature more than 500° C.,
    (2) torch cutting the slab in a longitudinal direction at a speed more than 300 mm/minute such that at least a surface portion is fused, and
    (3) removing at least a lower portion of the longitudinally cut fused surface portion of the slab.

2. A process according to claim 1, wherein the removing step is grinding.

3. A process according to claim 1, wherein the removing step is mechanical cutting.

4. A process according to claim 1, wherein the step of removal does not exceed in depth more than 1.0 mm.

* * * * *